United States Patent [19]

Botvin

[11] Patent Number: 5,594,225
[45] Date of Patent: Jan. 14, 1997

[54] METHODS AND SYSTEMS FOR CONDUCTING FINANCIAL TRANSACTIONS VIA FACSIMILE

[76] Inventor: Arthur D. Botvin, 5200 Keller Springs Rd. - Unit 533, Dallas, Tex. 75247

[21] Appl. No.: 476,655

[22] Filed: Jun. 7, 1995

[51] Int. Cl.⁶ .................................................. G06F 17/60
[52] U.S. Cl. ............................ 235/379; 235/380; 902/40
[58] Field of Search ................................ 235/379, 380; 902/25, 29, 40, 3; 395/149, 153, 200.04

[56] References Cited

U.S. PATENT DOCUMENTS

| | | | |
|---|---|---|---|
| 4,264,808 | 4/1981 | Owens et al. | 235/379 |
| 4,656,474 | 4/1987 | Mollier et al. | 902/3 X |
| 4,960,981 | 10/1990 | Benton et al. | 235/379 |
| 5,122,950 | 6/1992 | Benton et al. | 902/5 X |
| 5,265,008 | 11/1993 | Benton et al. | 902/5 X |
| 5,285,384 | 2/1994 | Gineris | 235/379 X |
| 5,420,405 | 5/1995 | Chasek | 235/379 |

*Primary Examiner*—Donald T. Hajec
*Assistant Examiner*—Michael G. Lee
*Attorney, Agent, or Firm*—Jack A. Kanz

[57] ABSTRACT

Financial transactions are performed rapidly by creating a commercial document, delivering an image of the document to the payee via facsimile, delivering an image of the document to the drawee via facsimile and processing the image of the document using a computer which responds to software commands for retrieving electronically encrypted information on the commercial paper document.

6 Claims, 6 Drawing Sheets

Fig. 2

METHODS AND SYSTEMS FOR CONDUCTING FINANCIAL TRANSACTIONS VIA FACSIMILE

This invention relates to financial transactions using facsimile machines at the party sites and software operating on computers to process the financial paper. More particularly, it relates to methods and apparatus for generating draft documents and distributing copies thereof to the drawees and to the payees or payee's bank via digital facsimile.

BACKGROUND OF THE INVENTION

Conventional commercial paper transactions such as bank checking accounts are typically associated with high overhead costs for time and labor. For example, check drafts generally require hand processing wherein the check is received by the drawer's bank (sometimes referred to hereinafter as "drawee") through conventional mail systems and information displayed on the check then manually entered into a computer or records database. Finally, the check must be physically retained for future record needs or be retained for return to the payor.

With the advance of computer and communications technology, the processing of commercial paper has aided in record keeping as well as a reduction in the physical flow of actual cash. For example, improved computer systems have evolved to the state where physical money need not be used. Instead, "value exchange" is achieved through electronic funds transfer. Typically, the evolving technologies are a true digital cash format. For example, some digital cash systems implement a "cybercash" account. Cybercash accounts are typically manipulated or handled by software operating on a computer with some computer user involvement. Such accounts aid in minimizing human error when processing accounts. Cybercash systems require a new operational transaction level in addition to the current commercial paper system. For example, a standard commercial paper system involves drafting a check by a payor to a payee. The payee then presents the check to his bank for payment. The payee's bank presents the check to the drawer's bank for payment. Upon presentment, funds are transferred from the payor's bank to the payee's bank, typically through an automated clearinghouse (ACH) or the Federal Reserve system.

A cybercash account system requires a drawer to establish a cybercash account in addition to his banking account. To use the cybercash account, the drawer is required to transfer funds from his conventional checking account into the cybercash account. Only then can the drawer withdraw the cybercash and use it to make purchases over the internet (a computer communications network having a purchasing or shopping network). Furthermore, to use such a system requires the user to have a sound knowledge of computers and computer software and of the internet-a skill or capacity not available to a large number of people.

Other variations on commercial paper systems merge computer technology with the electronic funds transfer system. For example, U.S. Pat. No. 4,960,981 (which relates generally to electronic funds transfer systems) shows a paper voucher which is customized and preprinted for an individual account. Facsimile machines are used to transfer voucher images in transactions between sellers and buyers.

Electronic financial transaction systems thus far generally require the involvement of a third party to generate the checks. That is, a drawer must order preprinted checks from a supplier for use in the financial transactions. Furthermore, such systems do not generate legal drafts which conform to the legal definition of commercial paper and, therefore, do not enjoy the status of "commercial paper." Such systems typically require verbal confirmation and exchange of information between the parties involved in the financial transaction, thereby increasing the involvement, time and expense of the parties to the transaction. Therefore, a commercial transaction system which would reduce the amount of physical paper generated; expedite the funds transfer process; and be readily implemented and accepted in the present commercial paper system which can be readily understandable by the public at large is highly desired.

SUMMARY OF THE INVENTION

In accordance with the present invention, a commercial paper transaction system is provided which employs facsimile processes to replace conventional commercial paper. A typical transaction system involves a drawer party or payor, a drawee party or payor's bank and a payee party. The system of the invention comprises a remote facsimile machine at the site or sites of the payor and the payor's bank. Images of the draft document are sent by the remote facsimile machine at the payor site to the facsimile machine at the payor's bank site. Computer equipment, programmed with appropriate software, electronically retrieves and processes the fields on the draft document for clearing the transaction after the draft document is presented by the payee party for payment of the draft document.

The draft document incorporates written information necessary to qualify for the legal requirements of commercial paper. Further, written information is converted in the document to computer-readable code readable by a computer at the payor's bank site which has the appropriate software. The draft document further has necessary information encrypted in computer-readable code for transportability of the document to payor's bank site using conventional processing systems.

The invention may take various forms and is suitable for use in a wide variety of assembly operations. Other features and advantages of the invention will become more readily understood from the following description taken in connection with the appended claims and attached drawing in which:

DESCRIPTION OF THE DRAWING

FIG. 2 is an illustration of a draft document as used in the system of the invention;

DESCRIPTION OF PREFERRED EMBODIMENT

Figure 1:
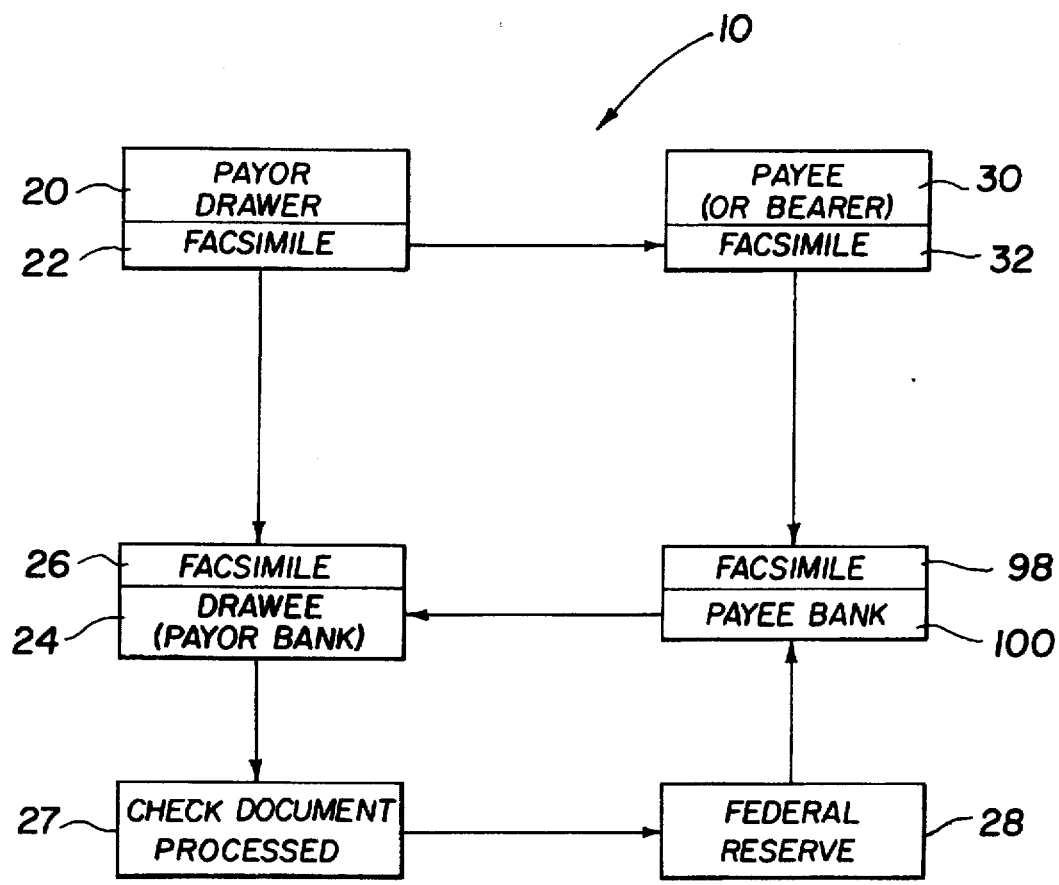
FIG. 1 is a block diagram depicting a system for conducting a financial transaction between a payor, a payor's bank and a payee in accordance with the invention.
Figure 2:
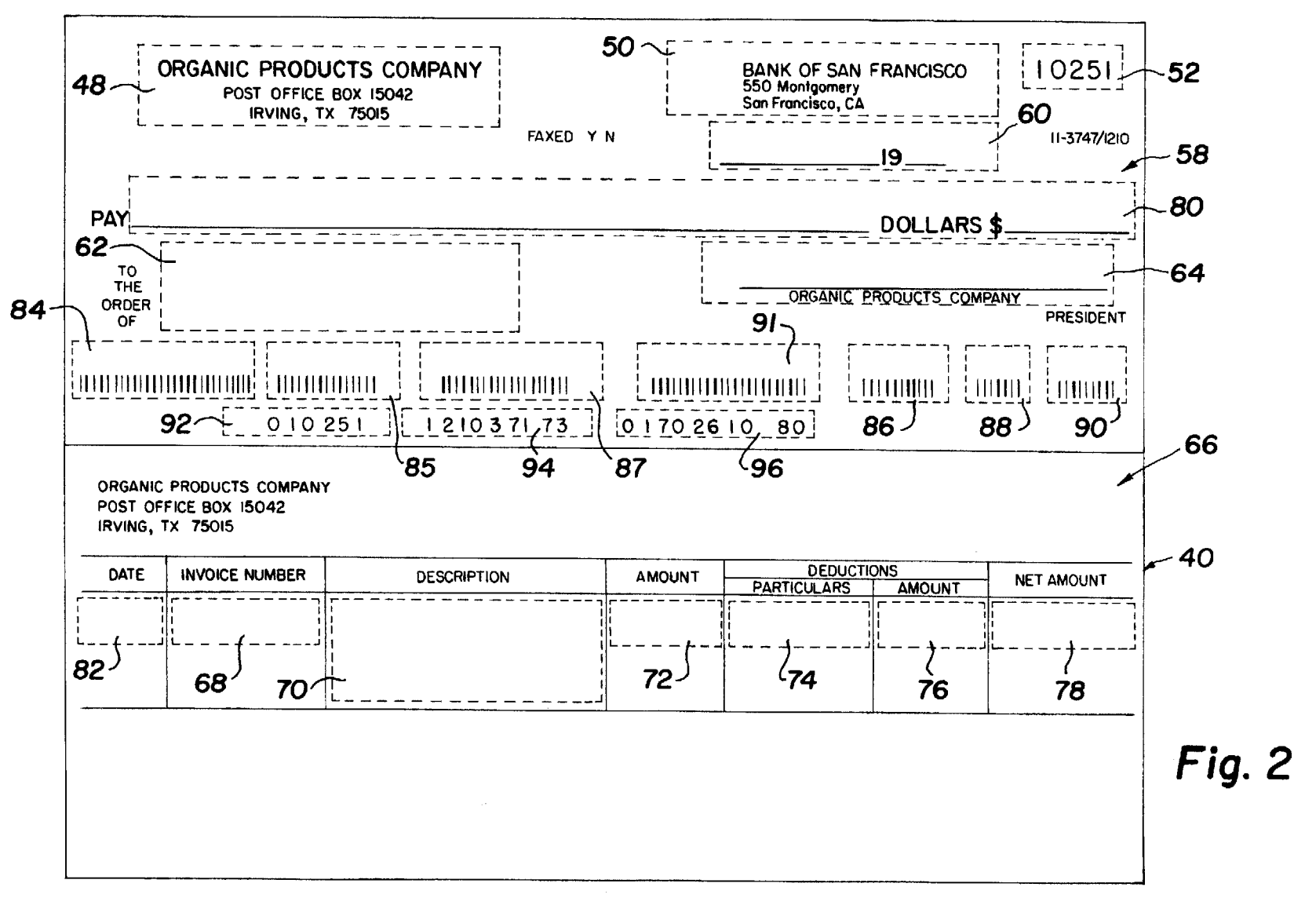
Figure 4:
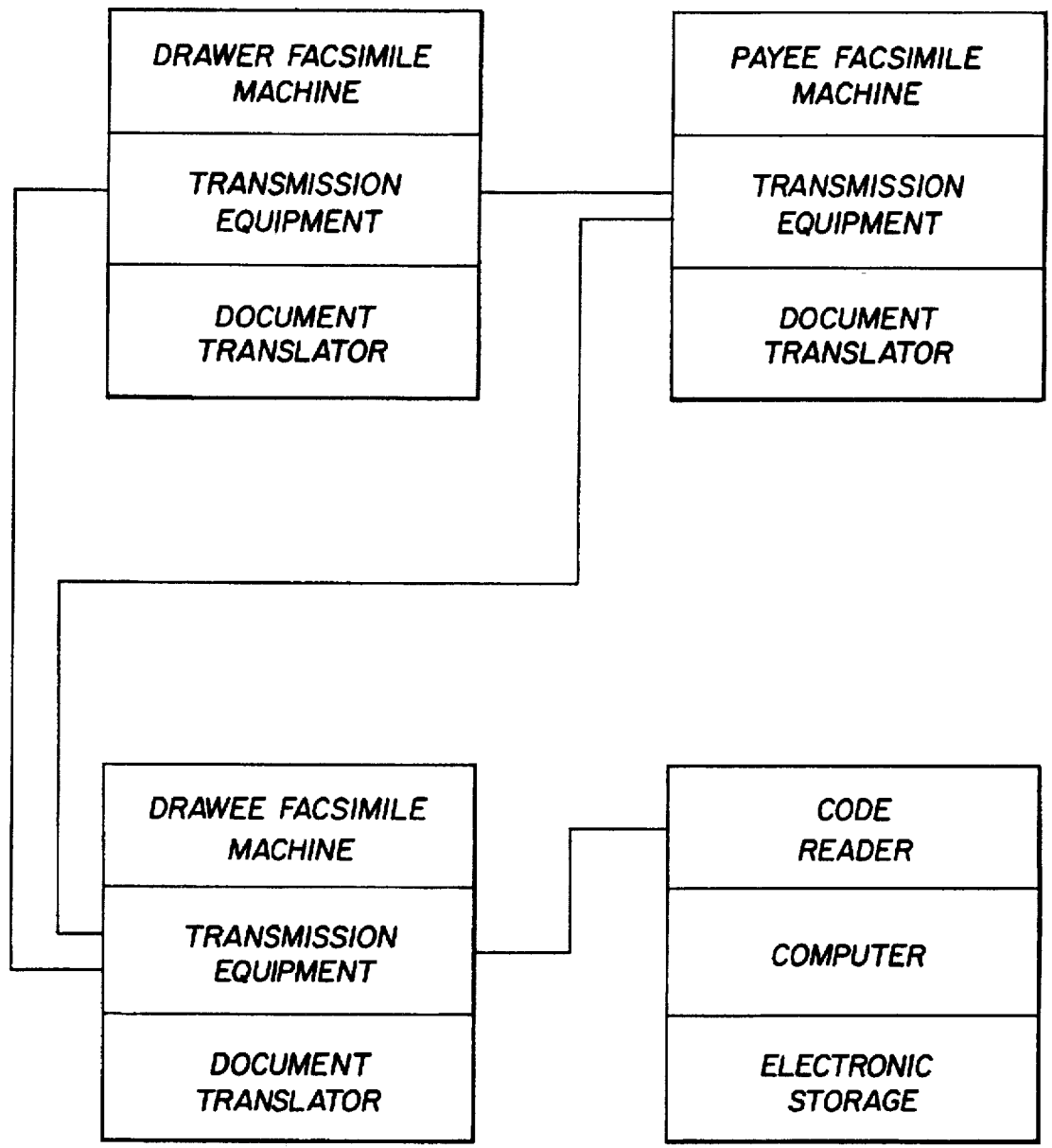
FIG. 4 is a schematic illustration of a system for conduction financial transaction in accordance with the invention.

An overview of the commercial paper transaction is represented generally by the numeral 10 in FIG. 1. A payor or drawer 20 electronically creates a commercial paper document or draft document 40 using a personal computer controlled by draft generation software. A draft document 40 (illustrated in FIG. 2) is a three-party commercial paper which is an order by the payor 20 to a drawee 24 (typically, a bank created under national law or state law) demanding that the payor's bank 24 pay money to still a third person, typically known as the payee or the bearer 30 (a payee is a bearer if the document is a pay-to-bearer draft). Once the document is created, the payor 20 uses a facsimile machine 22 to fax the commercial paper document 40 to the payee 30 via a payee receiving facsimile machine 32. Almost concurrently the commercial paper document 40 is also transmitted to the payor's bank 24 via facsimile machine 26. The draft document 40 is then processed by the payor's bank 24 for necessary information such as the drawer's account number 41, the check amount 80 and the routing code 85 as shown in FIGS. 1 and 2. A system for conducting such transactions is schematically illustrated in FIG. 4.

An important aspect of the invention is the draft document shown in FIG. 2. The payor 20 electronically generates the draft document 40 with the aid of a personal computer controlled by draft generating software. The payor 20 initializes the software by supplying his biographical information. Such information is the payor's address field 48, the payor bank address field 50, the starting check number field 52 (which is a sequential counter), the bank number field 87, the routing field 85, and payor's account number field 91. The initialization procedure is then complete.

To generate a draft document 40, the payor 20 is prompted to complete the information required in the draft portion 58 of the draft document 40. The payor 20 is also prompted to provide the date of the check for field 60 and the payee field data 62. The payor's signature is digitally scanned and stored as a digital bit map or another sufficient digital format for recall in the signature field 64. The payor's signature can be manually signed by the payor 20 if the document 40 is printed in a tangible form. The signature field 64 also permits visual verification of the payor's draft document 40. Further fields can be added to the draft document 40 such as a payee endorsement field and a payee account number field. Each such field can be adapted to the user's needs and provided by draft generating software operating on a personal computer.

A receipt portion 66 of the document 40 may be generated as desired. As illustrated in FIG. 2 the software, operating on the computer, prompts the payor 20 for an invoice number field 68 which mirrors the invoices used by the payor 20 if it is a business concern, a description field 70 to describe the nature of the payment, and a gross amount field 72. The payor 20 can then specify a deduction amount of the payment, if any, which is placed in field 74 in a percentage format as shown. If a percentage format is entered in the deduction field 74, the software generates the percentage amount in field 76. Otherwise, the deduction amount field 74 can be left blank and the payor can complete the amount field 76 with a deduction value. The net amount field 78 is then calculated by personal computer in conformance with instructions from the software. The value of the net amount field 78 is then copied to the draft value field 80 of the draft portion 58 in both alphanumeric format and numerical format as best shown in FIG. 2. The date field 82 of the draft portion 66 is copied from the date field 60 of the receipt portion 58.

Once the payor input is complete, the software translates the following fields into a computer-readable code (such as standard bar code format) near the lower edge of the draft portion 58; the payee field 62 is translated into payee field 84; the net amount field 78 is translated into amount field 86; date field 60 is translated into the computer-readable code date field 88; and the check number field 52 is translated into field 90. The information for routing computer-readable code field 85; payor's bank identification number computer-readable code field 87; and payor account number computer-readable code field 91 is provided by the payor 20 upon initialization of the draft generating software after loading the software on a computer. Other computer-readable code, optical, magnetic or otherwise, apart from bar coding may be used. For example, a DataGlyph format provided by Xerox Corporation can be used for the encryption method and placed in the signature field 64 or other suitable location on the draft document.

Conventional commercial transaction information is preferably encoded in optical code recognition (OCR) format. As shown in FIG. 2, the OCR drawer account number is imprinted in field 96, the OCR bank identification number is imprinted in field 94 and the OCR routing information number is imprinted in field 92. Using the combination of the conventional OCR and a computer-readable code format allows conventional draft processing through the OCR format (already commonplace in the conventional financial transaction systems) while simultaneously allowing expedited processing utilizing other computer readable code formats such as bar coding.

Once the draft document 40 is generated, the payor 20 initiates payment from his personal computer through a fax/modem or by printing a hard copy of the draft 40 and then sending the hard copy via facsimile machine 22. The payor 20 can fax the check to both the payee 30 and the payor's bank 24 with either form of technology. It should be noted that use of fax/modem retains the drafts in an electronic form, thus reducing need for paper. For taking advantage of the draft document code fields, the payor's bank 24 must have implemented the computer readable code deciphering equipment with accompanying software for rapid processing of the check document information.

The draft document 40 as shown in FIG. 1 is transmitted through the use of facsimile transmission technology. Facsimile machines 22, 26, 32 and 98 are conventional digital machines capable of CCITT, group III or greater image transmission. Such facsimile machines are not described in detail herein. Conventionally, a facsimile machine contains all the necessary electronic capability to function as a "front-end" processor for further processing by personal computers. That is, the facsimile machine acts as a digital scanner, converting standard text into a machine readable format. Fax, as used, indicates either of two processes currently available. For example, the payor 20 can fax the draft document 40 without reducing it to physical form via a fax/modem which has the capability of taking the electronic file format provided by the check generation software and translating the document into a machine-readable format such as a bit map. Other sufficient machine-readable formats can be implemented according to the algorithms used by the translational device. Otherwise, the draft document 40 is reduced to a hard copy print-out. The hard copy print-out is then fed into a facsimile machine which acts as a document reader with an optical scanner which translates the print-out into a digitized image format suitable for transmission to other facsimile machines. The digitized format is generally a bit map format. Character recognition equipment in the receiving facsimile machines 24, 32 or 98 utilize a computational algorithm to recognize and reconstruct the textual content of the digitized image to data transmitted over standard telephone transmission lines.

Figure 3A:
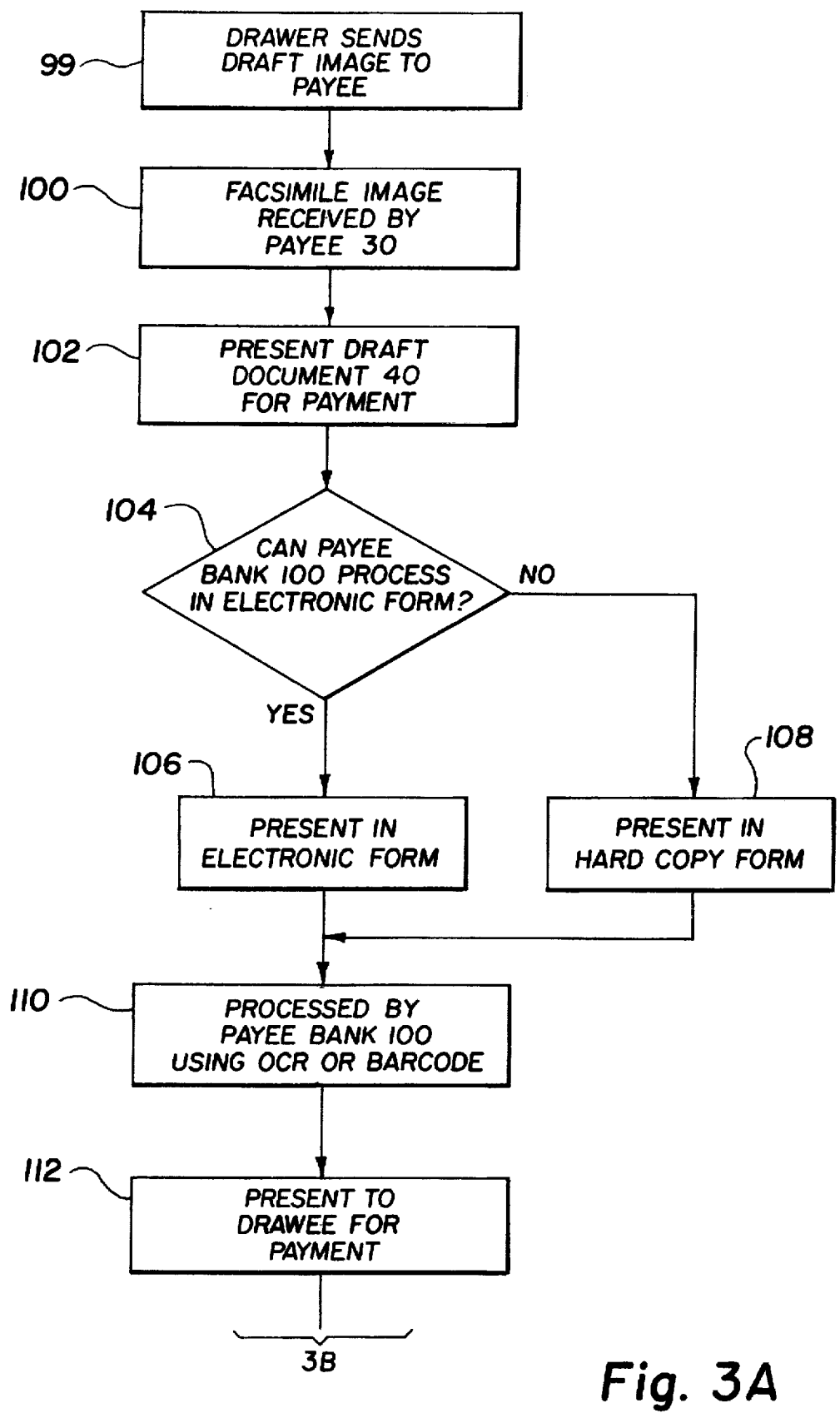
FIGS. 3(a)–(c) are a flow charts showing the transactional method of the invention and the programming steps of respective computers at the payor and the payor's bank sites.

To operate the system of the invention the payor 20 initially completes the draft document 40 as shown in FIG. 2 and as described above. The payor 20 then enters the telephone number of the payee into his facsimile machine 22. The document 40, now completed, is inserted into the facsimile machine 22 (or on a virtual piece of paper such as in a computer word processor program through a fax/modem) and the payor 20 initiates the facsimile transmission. The facsimile machine 22 of the payor 20 goes on-line with the facsimile machine 32 of the payee 30. The draft document 40 is electronically transmitted to the payee 30 via facsimile machine 32. The check document 40 is electronically transmitted to the payee via facsimile machine 32 as shown in FIG. 3(a) by step 99. The draft document can be received either as a hard copy print-out or remain in electronic form, depending upon the computer equipment configuration as set by the payee 30 as shown by step 100. At step 102 the draft document 40 is presented to the payee bank 40 for payment. At step 102 the check can either be in machine-readable format or in hard copy format. If in hard copy format, the payee 30 can remove the receipt portion 66 of the draft document 40 to retain for his records. If the payee bank 100 has the capacity to process the draft document 40 (step 104) in electronic form, then payee 30 presents the draft document 40 to the payee bank 100 via facsimile machine 98 (step 106). If the payee bank 100 does not have the capacity to process the draft document 40 in electronic form, then the payee 30 presents the draft document 40 in a hard copy form (step 108). In either form, the payee bank 100 can process the draft document 40 using conventional computer code deciphering equipment such as OCR or bar code scanning equipment (step 110). After processing the draft document 40, the payee bank 100 presents the check to the payor's bank 24 for payment (step 112).

Figure 3B:
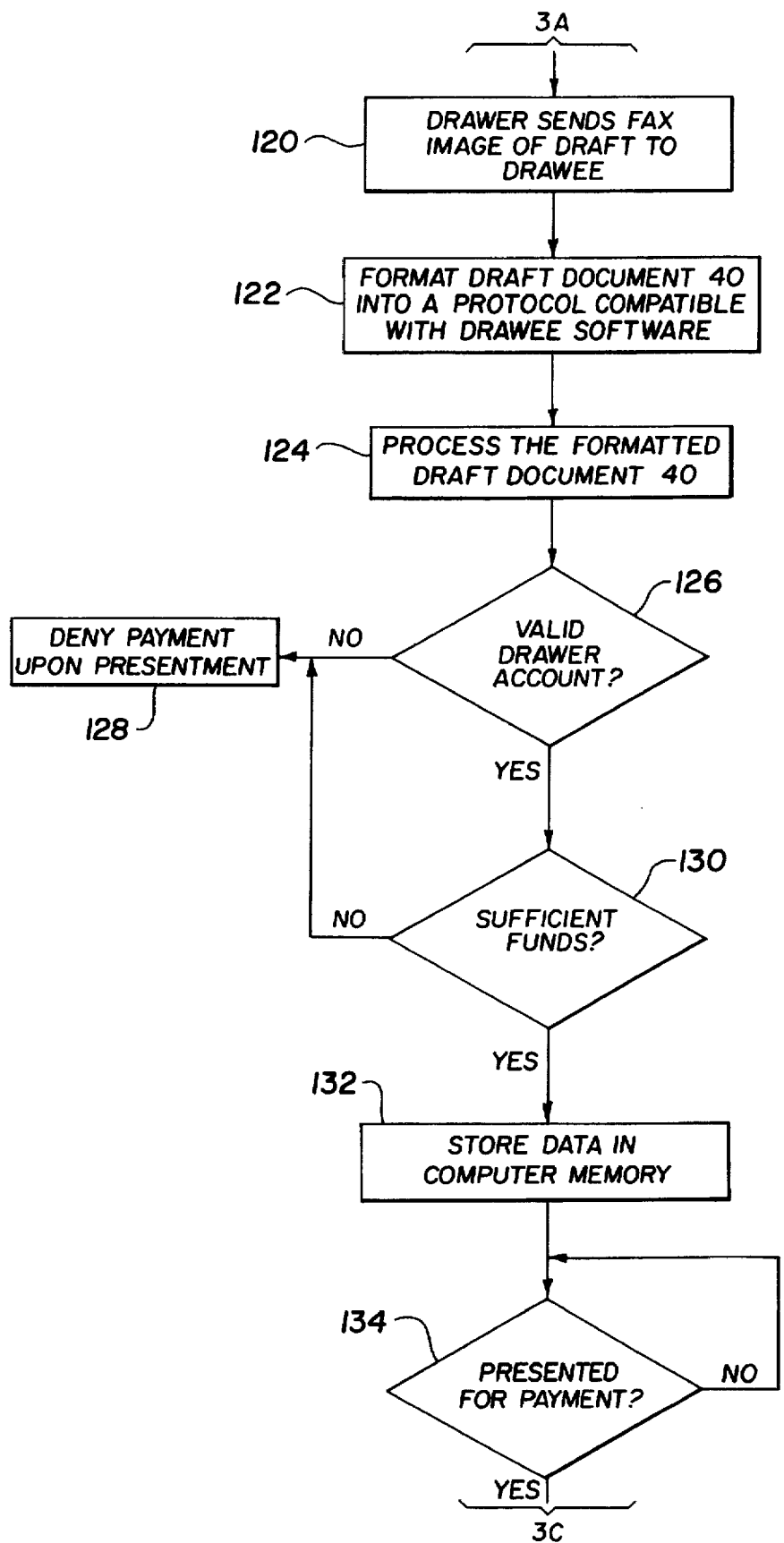

As illustrated in FIG. 3 (b), the draft document 40 is transmitted from the payor's facsimile machine 22 to the payor's bank 24 via facsimile machine 26 (step 120). The payor's bank 24 has the necessary equipment utilizing the appropriate processing algorithms to process the draft document 40. That is, upon a bit map input the payor bank computer formats the digitized facsimile image of the draft document 40 into a protocol which is compatible with that of the software (step 122). A program executed at or by the payor's bank computer processes the formatted draft document 40 (step 124) by analyzing and extracting the computer-readable code fields 84, 85, 87, 91, 86, 88 and 90 (see FIG. 2). The payor's bank computer verifies that the payor account number provided in computer-readable code field 86 is valid (step 126) and that the credit/debit balance of the payor's account is sufficient to cover the amount designated in the amount field 80 (step 130). If the account number is invalid or there are insufficient funds, the draft document 40, upon presentment for payment, will be denied (step 128). The processed data is stored in a database within the computer program memory (step 132). The payor's bank 24 then awaits for a request for payment against the draft document 40 (step 134).

Figure 3C:
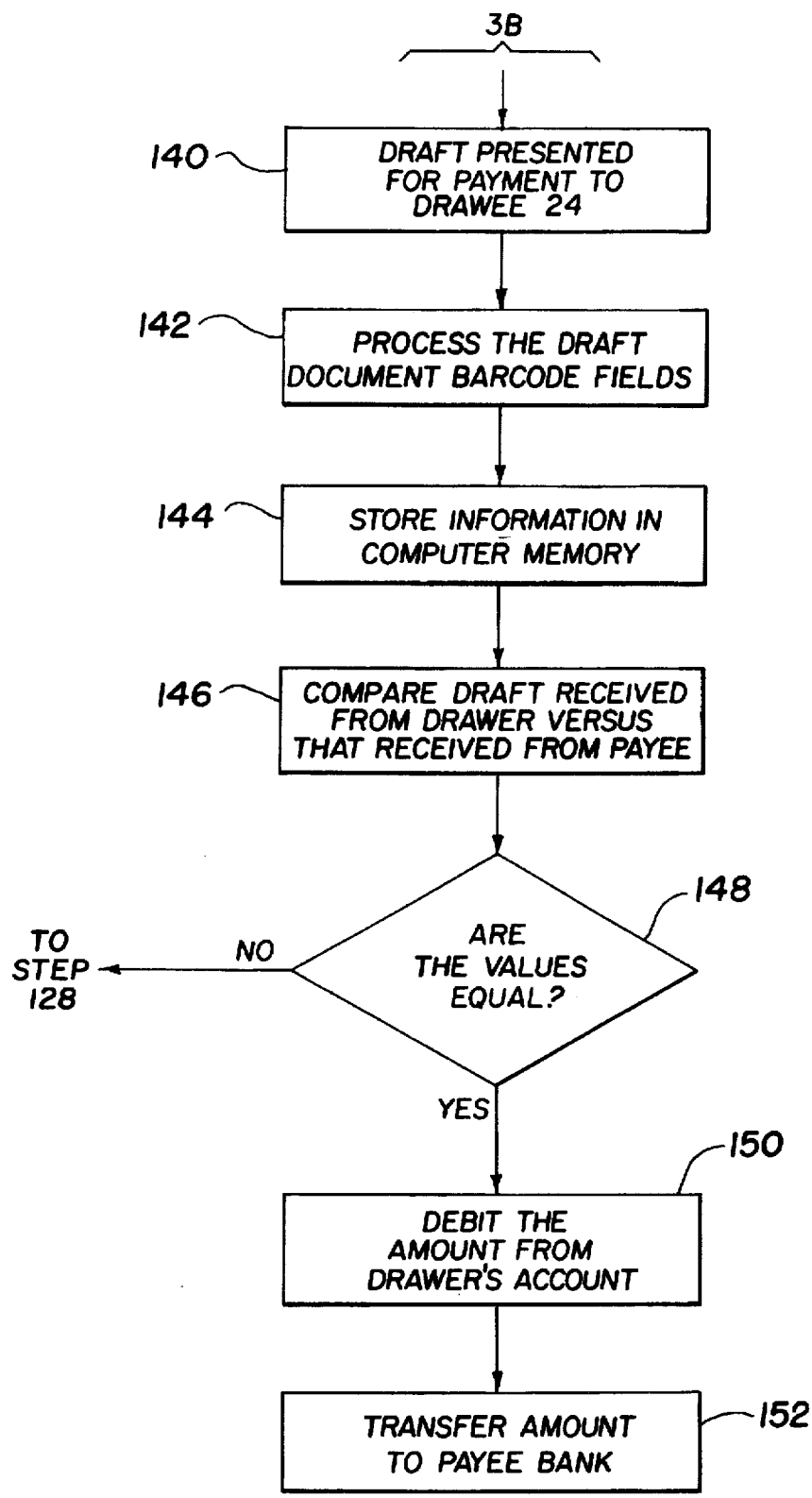

As illustrated in FIG. 3(c) the draft document 40 is presented for payment to the payor's bank 24 (step 130). The draft document 40 is processed for computer-readable code fields 84, 85, 87, 91, 86, 88 and 90 shown in FIG. 2 (step 142). This is done either by stand-alone scanning equipment having an algorithm for scanning the computer-readable code information or by reducing the draft document to a bit map format through use of a scanner device. After processing (step 142), the computer-readable code information is stored in computer memory (step 144). The information from the received draft document 40 from the payee bank 100 is then compared with the information from the draft document 40 transmitted by the payor 20 (step 146). If the information is identical or equal (step 148), the commercial transaction is completed by debiting the payor's account the value of the check (step 150). The amount is transferred to the payee bank 100 (step 152) through the Federal Reserve 80 (see FIG. 1) for credit in the payee's account. If the information is not identical or equal, then no funds are transferred (step 128, FIG. 3(b)).

By transmitting draft documents 40 via facsimile, the use of paper is reduced, thereby resulting in savings of natural resources. Furthermore, the transaction takes substantially less time for a transfer to occur.

Although the invention has been described with particular reference to special apparatus and methods of electrically generating, transmitting and processing draft documents, it is to be understood that the forms of the invention shown and described in detail are to be taken as illustrative of the principles thereof only and that various changes, modifications and rearrangements may be resorted to without departing from the spirit and scope of the invention as defined by the appended claims.

What is claimed:

1. A method of conducting financial transactions of a commercial paper document having a drawer party, a drawee party and a payee party, comprising the steps of:

(a) delivering an image of the commercial paper document to a payee party;

(b) electronically delivering an image of the commercial paper document from a facsimile machine at the site of the drawer to a facsimile machine at the site of the drawee party;

(c) processing the image of the commercial paper document using a computer responding to software commands for retrieving electronically encrypted information contained on the commercial paper document; and (d) clearing the financial transaction by the drawee party after receiving a request for payment of the commercial document from the payee party or party with title to the document by comparing the information received from the drawer party image with the image presented for payment on a computer responding to software commands.

2. A method as defined in claim 1 further comprising the steps of:

(a) authorizing a transfer of a specified amount at the order of the drawer from a specified drawer account to a payee account; and (b) electronically transferring the amount from the specified drawer account to the payee account.

3. A system for conducting financial transactions using a draft document having computer readable fields for transaction processing involving a drawer party, a drawee party and a payee party with each party located at a different site or sites comprising:

(a) a facsimile machine at the site or sites of the drawer party and the drawee party, each said facsimile machine including a document translator for translating the document into an electronic image and transmission equipment for transmitting the electronic image of the document and receiving document images received thereat; and (b) computer equipment programmed to (i) process the image of the draft document by responding to software commands for retrieving electronically encrypted information contained on the draft document; and (ii) clear the financial transaction by the drawee party after receiving a request for payment of the draft document by comparing the information received from the drawer party image with the image presented for payment.

4. A system as defined in claim 3 further comprising a facsimile machine at the site or sites of the payee party for receiving the electronic image of the document when sent to the payee party by the drawer party.

5. A system as defined in claim 3 wherein said computer equipment comprises:

(a) a personal computer responding to software commands for clearing the draft document after the document is presented by the payee for payment; and (b) means for electronically storing the draft document information after processing said draft document.

6. A system as defined in claim 3 wherein said computer equipment comprises:

(a) an application specific computer readable code reader;

(b) a personal computer attached to said application specific computer readable code reader, said personal computer containing a software program which controls the computer for processing the computer readable code fields on the draft document; and (c) means for electronically storing the draft document information after processing said draft document.

* * * * *

UNITED STATES PATENT AND TRADEMARK OFFICE
CERTIFICATE OF CORRECTION

PATENT NO.   : 5,594,225
DATED        : January 14, 1997
INVENTOR(S)  : Arthur D. Botvin It is certified that error appears in the above-indentified patent and that said Letters Patent is hereby corrected as shown below:

Col. 2, line 53, "are a flow charts" should read ---are flow charts---

Col. 2, lines 57-58, "conduction" should read ---conducting---

Col. 2, line 58, "transaction" should read ---transactions---

Col. 3, line 1, "(typically," should read ---(typically---

Col. 4, line 33, "computer readable" should read ---computer-readable---

Signed and Sealed this

Fifteenth Day of April, 1997

Attest:

BRUCE LEHMAN

Attesting Officer

Commissioner of Patents and Trademarks